(12) United States Patent
Kato et al.

(10) Patent No.: US 10,480,827 B2
(45) Date of Patent: Nov. 19, 2019

(54) SOLAR HEAT COLLECTOR

(71) Applicant: TOYO ENGINEERING CORPORATION, Tokyo (JP)

(72) Inventors: Yoshinobu Kato, Chiba (JP); Kiyoshi Satake, Chiba (JP)

(73) Assignee: TOYO ENGINEERING CORPORATION, Tokyo (JP)

( * ) Notice: Subject to any disclaimer, the term of this patent is extended or adjusted under 35 U.S.C. 154(b) by 163 days.

(21) Appl. No.: 15/573,283

(22) PCT Filed: Mar. 22, 2016

(86) PCT No.: PCT/JP2016/059071
§ 371 (c)(1),
(2) Date: Nov. 10, 2017

(87) PCT Pub. No.: WO2016/181709
PCT Pub. Date: Nov. 17, 2016

(65) Prior Publication Data
US 2018/0112892 A1    Apr. 26, 2018

(30) Foreign Application Priority Data

May 14, 2015 (JP) .................................. 2015-099166

(51) Int. Cl.
*F24S 10/40* (2018.01)
*F24S 10/70* (2018.01)
(Continued)

(52) U.S. Cl.
CPC ............... *F24S 10/45* (2018.05); *F24S 10/70* (2018.05); *F24S 23/70* (2018.05); *F24S 30/455* (2018.05);
(Continued)

(58) Field of Classification Search
CPC .. F24S 10/45; F24S 10/70; F24S 10/74; F24S 10/742; F24S 23/70; F24S 23/71; F24S 23/74; F24S 30/455
See application file for complete search history.

(56) References Cited

U.S. PATENT DOCUMENTS 4,545,366 A * 10/1985 O'Neill .................. F24S 23/31
126/698
7,296,410 B2 * 11/2007 Litwin .................... F03G 6/065
60/641.12
(Continued)

FOREIGN PATENT DOCUMENTS

CN    102072563 A    5/2011
CN    102252441 A    11/2011
(Continued)

OTHER PUBLICATIONS

Extended European Search Report dated Oct. 16, 2018 during the prosecution of EP Patent Application No. 16792434.9.
(Continued)

*Primary Examiner* — David J Laux
(74) *Attorney, Agent, or Firm* — Troutman Sanders LLP (57) ABSTRACT

A solar heat collector with high heat collection effect is provided. The solar heat collector includes a first heat collection pipe and a second heat collection pipe. The first heat collection pipe receives reflected light from a single-axial tracking solar type reflective mirror group to collect heat. The second heat collection pipe receives reflected light from the single-axial tracking solar type reflective mirror group and dual-axial tracking solar type reflective mirror groups to collect heat. The second heat collection pipe has an amount of heat collection per unit area larger than the first heat collection pipe. Therefore, compared with the use of only the first heat collection pipe, this ensures obtaining larger energy.

7 Claims, 5 Drawing Sheets

(51) Int. Cl.
  *F24S 30/455* (2018.01)
  *F24S 23/70* (2018.01)
  *F24S 50/20* (2018.01)

(52) U.S. Cl.
  CPC ........... *F24S 50/20* (2018.05); *F24S 2023/87* (2018.05); *Y02E 10/44* (2013.01); *Y02E 10/45* (2013.01)

(56) References Cited

U.S. PATENT DOCUMENTS

| | | | |
|---|---|---|---|
| 8,978,641 B2* | 3/2015 | Buckley | F24S 25/00 126/652 |
| 9,212,829 B1* | 12/2015 | Friesel | F24S 80/30 |
| 2005/0126170 A1 | 6/2005 | Litwin | |
| 2010/0051015 A1* | 3/2010 | Ammar | F24S 23/82 126/600 |
| 2010/0051018 A1* | 3/2010 | Ammar | F24S 23/82 126/634 |
| 2010/0205963 A1 | 8/2010 | Ammar | |
| 2011/0079267 A1* | 4/2011 | Raymond | F03G 6/067 136/246 |
| 2011/0303214 A1 | 12/2011 | Welle | |
| 2012/0117968 A1* | 5/2012 | Shwartzman | F24S 10/45 60/641.15 |
| 2013/0152916 A1 | 6/2013 | Tamaura | |
| 2014/0138952 A1 | 5/2014 | Marumoto et al. | |
| 2015/0096552 A1 | 4/2015 | Satoh et al. | |
| 2015/0260430 A1 | 9/2015 | Tamaura | |
| 2017/0159972 A1 | 6/2017 | Kato et al. | |

FOREIGN PATENT DOCUMENTS

| | | |
|---|---|---|
| CN | 102967055 A | 3/2013 |
| CN | 202815299 U | 3/2013 |
| CN | 104296396 A | 1/2015 |
| JP | 2010-072549 A | 4/2010 |
| JP | 2010-286200 A | 12/2010 |
| JP | 2013-539000 A | 10/2013 |
| JP | 2013-228184 A | 11/2013 |
| JP | 2014-006018 A | 1/2014 |
| JP | 2014-092086 A | 5/2014 |
| JP | 2014-134336 A | 7/2014 |
| JP | 2015-014444 A | 1/2015 |
| JP | 2015-049005 A | 3/2015 |
| WO | 2010/024830 A1 | 3/2010 |
| WO | WO2013/0020541 A1 | 1/2013 |
| WO | WO2016/017323 A1 | 2/2016 |

OTHER PUBLICATIONS e-NEXI (Oct. 2010 issue) Published/Edited by Public Relations/Overseas Group, General Management and Administration Department, Nippon Export and Investment Insurance (NEXI).
International Search Report dated Jun. 14, 2016 filed PCT/JP2016/059071.
Chinese Office Action issued in corresponding Chinese Application No. 201680023801.7 dated Jun. 5, 2019 (in Chinese only).

* cited by examiner

SOLAR HEAT COLLECTOR

CROSS-REFERENCE TO RELATED APPLICATIONS

This is a U.S. national phase application under 35 U.S.C. § 371 of International Patent Application No. PCT/JP2016/059071, filed Mar. 22, 2016, and claims benefit of priority to Japanese Patent Application No. 2015-099166, filed May 14, 2015. The entire contents of these applications are hereby incorporated by reference.

FIELD OF TECHNOLOGY

The present invention relates to a solar heat collector.

BACKGROUND

There has been developed a technique that uses solar light and solar heat as renewable energy (JP-A-2014-6018, JP-A-2010-72549, JP-A-2013-539000, JP-A-2014-134336, JP-A-2015-14444 and E-NEXI (ISSUED IN OCTOBER, 2010), issuing body: issued and edited by Nippon Export and Investment Insurance (NEXI), General Management and Public Relations Group, Overseas group, "Solar Heat Use").

JP-A-2014-6018 describes inventions of a metal pipe for solar light collection, a vacuum tube type solar light collection pipe, and a solar power generation apparatus.

A heat collection pipe 30 described in the paragraphs 0059 and 0060 (FIGS. 8 and 9) includes a light-selective absorbing film 12 and a glass lining layer 13. The heat collection pipe 30 includes a metal pipe 11, which is formed of a metal pipe inside of which a heating medium flows, and a glass pipe 31, which is disposed so as to cover the metal pipe 11 with a predetermined interval.

Between the metal pipe 11 and the glass pipe 31, an airtightly sealed region 33 is formed. It is described that the sealed region 33 is usually in a vacuum state of, for example, $1 \times 10^{-3}$ Pa or less.

The fact that such double-pipe-structure heat collection pipe is applicable to solar power generation is also described in "4. Trough Solar Power Generation Facility" on p12 and p13 in E-NEXI (ISSUED IN OCTOBER, 2010).

It is described in the paragraph 0022 that while the light-selective absorbing film 12 preferably absorbs solar radiation energy efficiently, that is, absorbs light of 400 to 900 nm, the light-selective absorbing film 12 can reduce thermal radiation to the outside.

JP-A-2010-72549 describes an invention of a solar heat-combined power generation apparatus for teaching material. The paragraphs 0012 to 0015 describe the use of a wavelength-selective reflection film to separate solar light into a light component (a short wavelength side) and a thermal component (a long wavelength side).

JP-A-2013-539000 and JP-A-2014-134336 describe inventions of solar heat collectors. JP-A-2015-14444 describes an invention of a heat collection pipe (a heat collection pipe with a double-pipe structure) used to collect heat from solar heat.

SUMMARY

An object of the present invention is to provide a solar heat collector whose heat collection efficiency is enhanced. In the case where a combination of a reflective mirror group including a single-axial tracking solar type reflective mirror group and a dual-axial tracking solar type reflective mirror group or only a dual-axial tracking solar type reflective mirror group is used as reflection means of this solar heat collector, a combination of heat collection pipes having different degrees of concentration (a magnification of concentration of solar light) and amounts of heat collection per unit is used as the heat collection mean A first invention provides a solar heat collector comprising: a dual-axial tracking solar type reflective mirror group; and heat collection means configured to collect light from the reflective mirror group to obtain heat, wherein: a heating medium is caused to move from a first end of the heat collection means on an upstream to a second end on an opposite side on a downstream, the heat collection means includes a continuous heating medium flow passage including a combination of a first heat collection pipe and a second heat collection pipe, the first heat collection pipe having a small amount of heat collection per unit area, the second heat collection pipe having an amount of heat collection per unit area larger than the first heat collection pipe, and the first heat collection pipe and the second heat collection pipe have a double-pipe structure including an inner metal pipe, a glass pipe, and a vacuum space, the heating medium flowing through the metal pipe, the glass pipe being disposed outside the metal pipe, the vacuum space being disposed between the metal pipe and the glass pipe.

A second invention provides a solar heat collector comprising: a reflective mirror group including a single-axial tracking solar type reflective mirror group and a dual-axial tracking solar type reflective mirror group; and heat collection means configured to collect light from the reflective mirror group to obtain heat, wherein: a heating medium is caused to move from a first end of the heat collection means on an upstream to a second end on an opposite side on a downstream, the single-axial tracking solar type reflective mirror group includes a combination of reflective mirrors selected from Fresnel reflective mirrors and trough reflective mirrors, the dual-axial tracking solar type reflective mirror group includes a combination of dual-axial tracking solar type reflective mirrors, the dual-axial tracking solar type reflective mirror having a surface area 5 to 20% of a surface area of the one single-axial tracking solar type reflective mirror, the heat collection means includes a continuous heating medium flow passage including a combination of a first heat collection pipe and a second heat collection pipe, the first heat collection pipe having a small amount of heat collection per unit area, the second heat collection pipe having an amount of heat collection per unit area larger than the first heat collection pipe, the first heat collection pipe and the second heat collection pipe have a double-pipe structure including an inner metal pipe, a glass pipe, and a vacuum space, the heating medium flowing through the metal pipe, the glass pipe being disposed outside the metal pipe, the vacuum space being disposed between the metal pipe and the glass pipe, the first heat collection pipe receives reflected light from the single-axial tracking solar type reflective mirror group to collect heat, and the second heat collection pipe receives reflected light from the single-axial tracking solar type reflective mirror group and the dual-axial tracking solar type reflective mirror group to collect heat.

A third invention provides a solar heat collector comprising: a dual-axial tracking solar type reflective mirror group; and heat collection means configured to collect light from the reflective mirror group to obtain heat, wherein: a heating medium is caused to move from a first end of the heat collection means on an upstream to a second end on an opposite side on a downstream, the heat collection means includes a combination of heat collection pipes, the heat collection pipes have a double-pipe structure including an inner metal pipe, a glass pipe, and a vacuum space, the heating medium flowing through the metal pipe, the glass pipe being disposed outside the metal pipe, the vacuum space being disposed between the metal pipe and the glass pipe, and the combination of the heat collection pipes includes the heat collection pipes coupled to one another.

A fourth invention provides a solar heat collector comprising: a reflective mirror group including a single-axial tracking solar type reflective mirror group and a dual-axial tracking solar type reflective mirror group; and heat collection means configured to collect light from the reflective mirror group to obtain heat, wherein: a heating medium is caused to move from a first end of the heat collection means on an upstream to a second end on an opposite side on a downstream, the single-axial tracking solar type reflective mirror group includes a combination of a reflective mirrors selected from Fresnel reflective mirrors and trough reflective mirrors, the dual-axial tracking solar type reflective mirror group includes a combination of dual-axial tracking solar type reflective mirrors, the dual-axial tracking solar type reflective mirror having a surface area 5 to 20% of a surface area of the one single-axial tracking solar type reflective mirror, the heat collection means includes a continuous heating medium flow passage including a combination of a first heat collection pipe and a second heat collection pipe, the first heat collection pipe having a small amount of heat collection per unit area, the second heat collection pipe having an amount of heat collection per unit area larger than the first heat collection pipe, the first heat collection pipe and the second heat collection pipe have a double-pipe structure including an inner metal pipe, a glass pipe, and a vacuum space, the heating medium flowing through the metal pipe, the glass pipe being disposed outside the metal pipe, the vacuum space being disposed between the metal pipe and the glass pipe, the first heat collection pipe is disposed on the upstream, the second heat collection pipe being disposed on the downstream with respect to the first heat collection pipe, the first heat collection pipe being coupled to the second heat collection pipe with a transport pipe for the heating medium, the first heat collection pipe receives reflected light from the single-axial tracking solar type reflective mirror group to collect heat, and the second heat collection pipe receives reflected light from the dual-axial tracking solar type reflective mirror group to collect heat.

The solar heat collector of the present invention uses a dual-axial tracking solar type reflective mirror group or a combination of a single-axial tracking solar type reflective mirror group and a dual-axial tracking solar type reflective mirror group as a reflective mirror group. As the heat collection means, a first invention, a second invention, and a fourth invention use a first heat collection pipe having a small amount of heat collection per unit area and a second heat collection pipe (a heat collection pipe of a third invention) having an amount of heat collection per unit area larger than the first heat collection pipe.

In view of this, the first invention, the second invention, and the fourth invention can reduce the used part of the second heat collection pipe, which is comparatively expensive. Additionally, higher heat collection effect can be obtained.

The third invention uses the dual-axial tracking solar type reflective mirror group and a plurality of heat collection pipes equivalent to the second heat collection pipe in combination. This ensures shorting the entire length of the heat collection pipes. Accordingly, the heat collection effect is enhanced. Additionally, an amount of heat dissipation from the heat collection pipe can be reduced. Therefore, the highest heat collection effect can be obtained.

Figure 1:
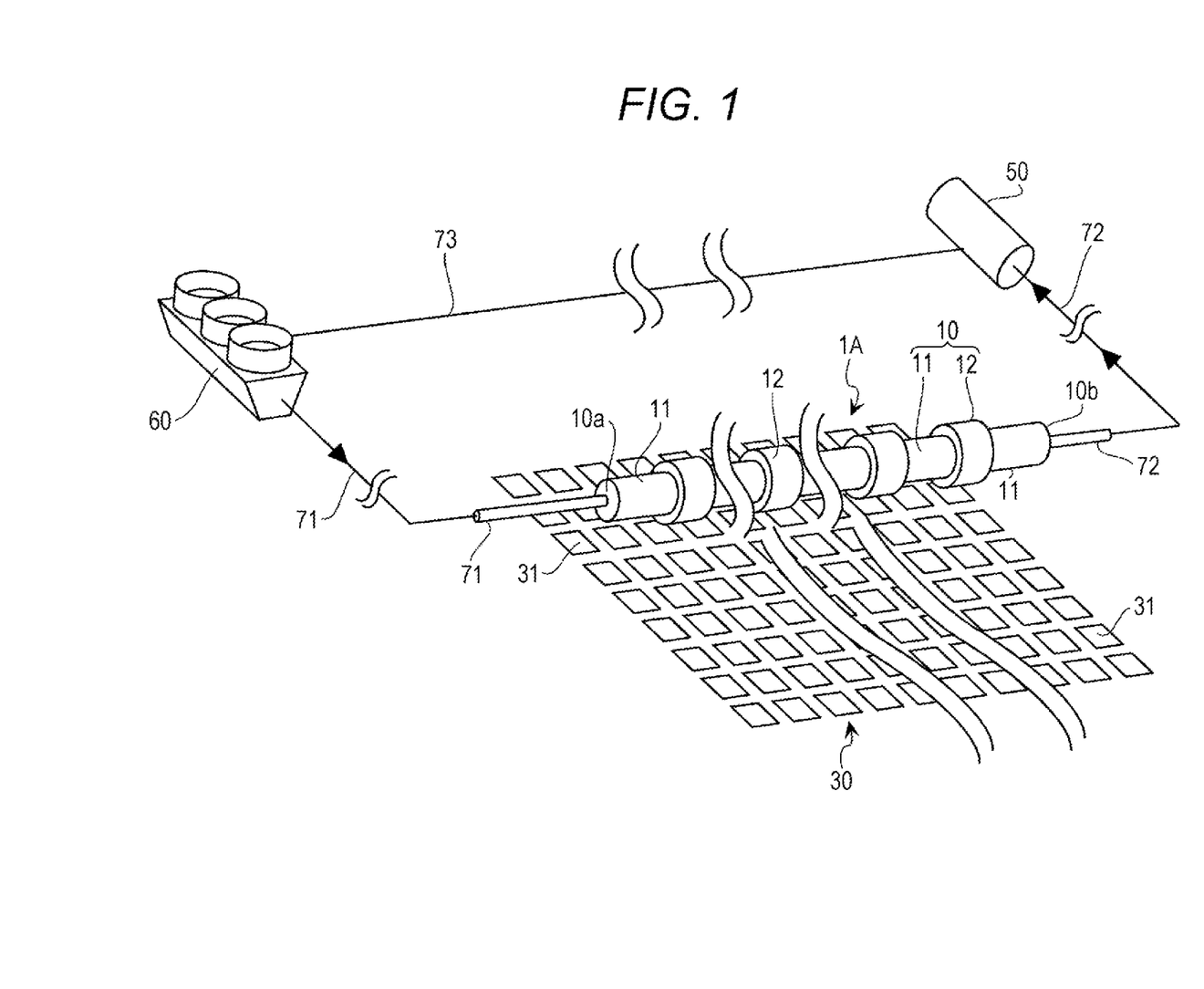
FIG. 1 is a perspective view of a power generation system using a solar heat collector of the present invention.

(1) Solar Heat Collector in FIG. 1 (First Invention)

A solar heat collector 1A illustrated in FIG. 1 includes a reflective mirror group and heat collection means.

The reflective mirror group includes a dual-axial tracking solar type reflective mirror group 30.

The dual-axial tracking solar type reflective mirror group 30 includes a combination of a required number of reflective mirrors 31.

The dual-axial tracking solar type reflective mirror group 30 may have the number adjustable as necessary according to an amount of heat collection, a situation of an installation site, and the like.

As the reflective mirror 31, for example, a reflective mirror with a size of around 2×2 m is applicable. Note that, as long as dual-axis control can be performed with the reflective mirror, the size is not limited to the above-described size.

FIG. 1 illustrates the square reflective mirrors as the reflective mirrors 31. Note that, the reflective mirrors 31 may have another shape.

Heat collection means 10 includes a combination of first heat collection pipes 11, which have the small amount of heat collection per unit area, and second heat collection pipes 12, which have the amount of heat collection per unit area larger than that of the first heat collection pipes 11.

The plurality of respective first heat collection pipes 11 and second heat collection pipes 12 are coupled in alternation in the longitudinal direction.

The first heat collection pipes 11 and the second heat collection pipes 12 receive reflected light from the dual-axial tracking solar type reflective mirror group 30 to collect the heat.

Both the first heat collection pipe 11 and the second heat collection pipe 12 are double-structure pipes that include an inner metal pipe through which a heating medium flows, a glass pipe outside the metal pipe, and a vacuum space between the metal pipe and the glass pipe. The heat collection pipe having the above-described double-pipe structure itself is publicly known as the heat collection pipe (the above-described JP-A-2014-6018, JP-A-2015-14444 and E-NEXI (ISSUED IN OCTOBER, 2010)).

In FIG. 1, for easy understanding of a difference between the first heat collection pipe 11 and the second heat collection pipe 12, the first heat collection pipe 11 and the second heat collection pipe 12 have outer diameters of different sizes. However, the heat collection pipes with identical dimensions are also applicable.

The first heat collection pipes 11 with the small amount of heat collection per unit area and the second heat collection pipes 12 with the amount of heat collection per unit area larger than that of the first heat collection pipes 11 are adjusted such that the second heat collection pipes 12 have the larger amount of heat collection (amount of heat energy) when identical areas are irradiated with solar light.

It is only necessary that an amount of heat collection per unit area of the first heat collection pipe 11 (E1) and an amount of heat collection per unit area of the second heat collection pipe 12 (E2) meet the relationship of E2>E1. Note that, the relationship of E2/E1≥1.5 is preferably met.

As a method for providing the magnitude relationship of the amount of heat collections (the amount of heat energies) to the first heat collection pipe 11 and the second heat collection pipe 12, a method for forming different wavelength-selective films on the respective surfaces of the metal pipes is applicable.

Here, the "wavelength-selective film" means a film having an effect identical to a "light-selective absorbing film 12" in JP-A-2014-6018 and a "wavelength-selective reflection film" in JP-A-2010-72549.

As a method for increasing the amount of heat collection of the second heat collection pipe 12 larger than the amount of heat collection of the first heat collection pipe 11, a method for setting a relationship between a transmission amount (X1) of a thermal component (a long wavelength side) of the wavelength-selective film formed on the surface of the metal pipe of the first heat collection pipe 11 and a transmission amount (X2) of a thermal component (a long wavelength side) of the wavelength-selective film formed on the surface of the metal pipe of the second heat collection pipe 12 to X2>X1 is applicable.

For example, setting a relationship between an area (Y1) of the wavelength-selective film that can transmit the thermal component (the long wavelength side) formed on the surface of the metal pipe of the first heat collection pipe 11 and an area (Y2) of the wavelength-selective film that can transmit the thermal component (the long wavelength side) formed on the surface of the metal pipe of the second heat collection pipe 12 to Y2>Y1 ensures meeting the relationship of X2>X1.

As the first heat collection pipe 11 and the second heat collection pipe 12, SCHOTT PTR 70Advance, SCHOTT PTR 70 Premium, SCHOTT PTR 70, and the like, which are double-structure pipes for solar light heat collection sold by SCHOTT in Germany, are also applicable. Among these double-structure pipes, SCHOTT PTR 70Advance has the maximum amount of heat collection. Therefore, the SCHOTT PTR 70Advance is applicable as the second heat collection pipe.

The first heat collection pipes 11 and the second heat collection pipes 12 are coupled with coupling means (not illustrated).

The coupling means may be any means as long as the coupling means can couple the metal pipe and the glass pipe of the first heat collection pipe 1 to the metal pipe and the glass pipe of the second heat collection pipe 12. Using a method for using a metallic adapter, a method for using a coupling structure and a coupling method illustrated in FIGS. 3 to 6 in JP-A-2014-6018, a coupling structure and a coupling method illustrated in FIGS. 1 and 2 in JP-A-2015-14444 and the like, the first heat collection pipes 11 and the second heat collection pipes 12 can be coupled.

The first heat collection pipes 11 and the second heat collection pipes 12, which constitute the heat collection means 10, include a continuous heating medium flow passage (a continuous metal pipe) from a first end 10a to a second end 10b.

The first end 10a side, which is positioned upstream on the heat collection means 10, is coupled to an inlet-side transport pipe 71 for the heating medium. The second end 10b side, which is positioned downstream, is coupled to an outlet-side transport pipe 72 for the heating medium.

The inlet-side transport pipe 71 and the outlet-side transport pipe 72 are formed of a metal pipe. As necessary, to keep the temperature, a heat insulating material and the like can be wound around the outsides of the inlet-side transport pipe 71 and the outlet-side transport pipe 72.

A part of the inlet-side transport pipe 71 and the outlet-side transport pipe 72 are indicated by the solid lines. Note that, the parts with the identical reference numerals belong to the identical heat collection pipe.

The following describes a method for operating a solar heat collector 1 of the present invention with the power generation system illustrated in FIG. 1, which includes the solar heat collector 1A. As the heating medium passing through the first heat collection pipes 11 and the second heat collection pipes 12, publicly known liquid (such as molten salt, hot oil, and water) and gas (such as air, nitrogen, and carbon dioxide) are applicable. The following describes the embodiments using the water.

The water is delivered from the transport pipe 71 to the first water collection pipe 11 of the first end 10a, which is on the upstream of the heat collection means 10. The water is fed from a water source (not illustrated) at the beginning of the operation.

In the dual-axis tracking according to the position of the sun, the dual-axial solar type reflective mirror group 30 reflects and sends the received solar heat to the first heat collection pipes 11 and the second heat collection pipes 12.

At this time, among the large number of reflective mirrors 31, a part of the reflective mirrors 31 may send the solar heat to the first heat collection pipes 11 and the remaining reflective mirrors 31 may send the solar heat to the second heat collection pipes 12. Note that, the number of reflective mirrors 31 that send the solar light to the first heat collection pipes 11 (n1) and the number of reflective mirrors 31 that send the solar light to the second heat collection pipes 12 (n2) meet the relationship of n2>n1. For example, with n1+n2=100, meeting n1=10 to 20 and n2=90 to 80 are preferable.

In a process where the water as the heating medium flows from the upstream (the first end 10a) to the downstream (the second end 10b), the water is heated and turns into high-temperature water vapor (energy). The amount of heat collection per unit area of the second heat collection pipes 12 is larger than that of the first heat collection pipes 11. Therefore, the second heat collection pipes 12 receive the heat energy larger than the first heat collection pipes 11. Accordingly, compared with the case of only the first heat collection pipes 1, the second heat collection pipes 12 can obtain the water vapor at a higher temperature.

Accordingly, as illustrated in FIG. 1, the combination of the first heat collection pipes 11 and the second heat collection pipes 12 as the heat collection means ensures decreasing the used parts of the second heat collection pipes 12, which are more expensive than the first heat collection pipes 11. Additionally, compared with the case of using only the first heat collection pipes 11, this allows obtaining the considerably large amount of energy.

Afterwards, the water vapor is supplied from the water vapor supply pipe 72 to an electric generation apparatus 50 that includes a turbine and an electric generator.

The water vapor supplied to the electric generation apparatus 50 rotates the turbine. A power generated by the rotation of the turbine is transmitted to the electric generator, and thus the electricity is generated.

The water vapor used to rotate the turbine is sent from a vapor return line 73 to a condenser 60. Then, a condensation process is performed on the water vapor, thus returning the water vapor to the water. Afterwards, the water deliver line (the transport pipe) 71 supplies the water to the heat collection means 10.

Insofar as within a time during which the solar light is usable, repeating the above-described circulation operation continues the electric generation using the solar heat.

During nighttime, the electric generation using the heat stored in a heat storage body and the like during daytime is also possible.

Figure 2:
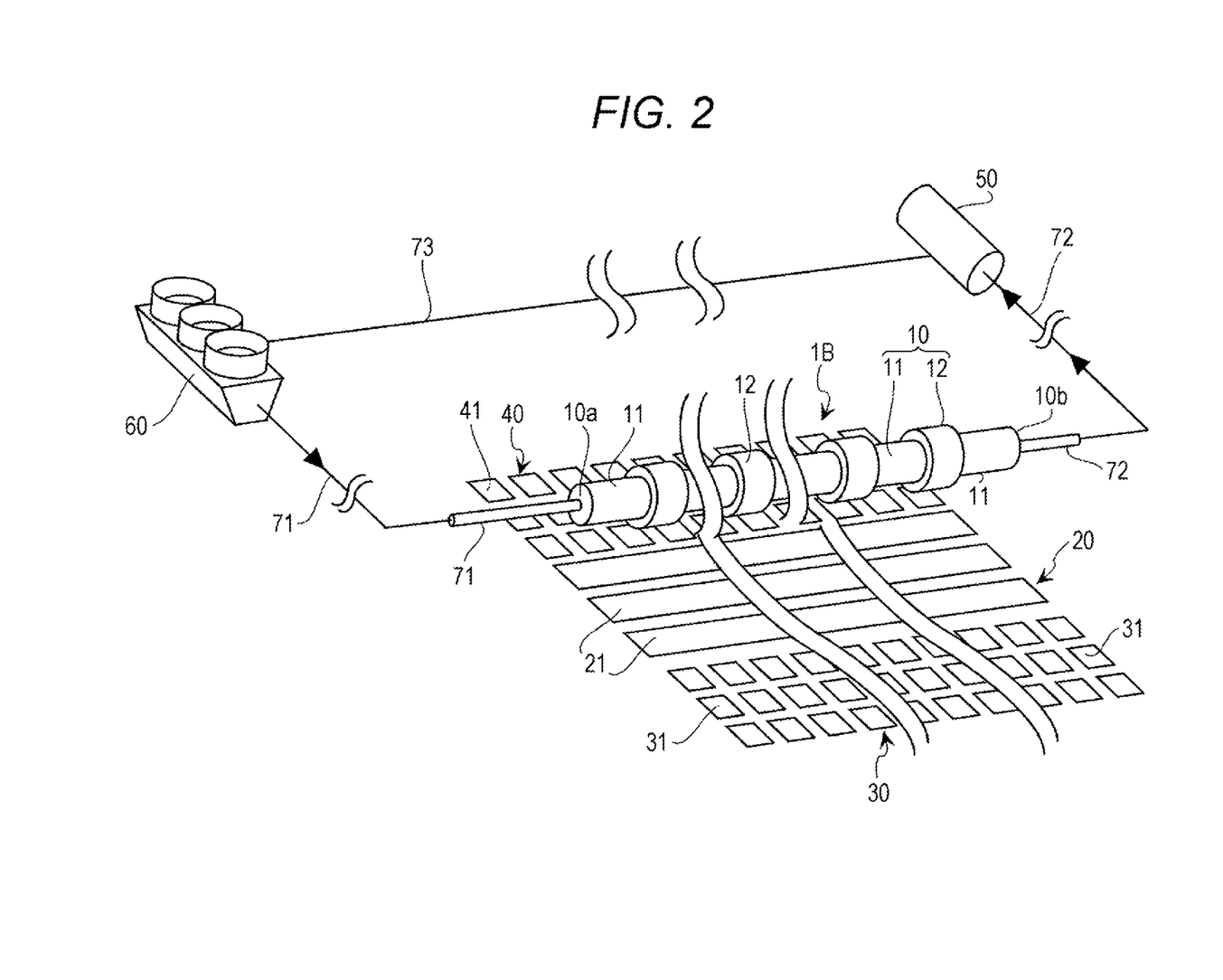
FIG. 2 is a perspective view of a power generation system using a solar heat collector of the present invention of another embodiment.

(2) Solar Heat Collector in FIG. 2 (Second Invention)

A solar heat collector 1B includes the reflective mirror group and the heat collection means.

The reflective mirror group includes a single-axial tracking solar type reflective mirror group 20 and dual-axial tracking solar type reflective mirror groups 30 and 40.

The single-axial tracking solar type reflective mirror group 20 includes a combination of a required number of linear Fresnel type reflective mirrors 21.

The linear Fresnel type reflective mirrors 21 are disposed spaced in the width direction such that the respective long axes face an identical direction (for example, a north-south direction, but the direction is not limited to this direction).

The dual-axial tracking solar type reflective mirror group is disposed separated into the first dual-axial tracking solar type reflective mirror group 30 and the second dual-axial tracking solar type reflective mirror group 40 on both sides in the long axis direction of the single-axial tracking solar type reflective mirrors 21.

Here, when the linear Fresnel type reflective mirrors 21 are disposed such that the respective long axes face the north-south direction, the first dual-axial tracking solar type reflective mirror group 30 and the second dual-axial tracking solar type reflective mirror group 40 are disposed in the directions in which the light is efficiently collected such that a site where the amount of heat collection becomes large is generated at a heat-receiving pipe at the outside of the single-axial tracking solar type reflective mirrors.

The first dual-axial tracking solar type reflective mirror group 30 includes the combination of the required number of reflective mirrors 31.

The second dual-axial tracking solar type reflective mirror group 40 includes a combination of a required number of reflective mirrors 41.

The first dual-axial tracking solar type reflective mirror group 30 and the second dual-axial tracking solar type reflective mirror group 40 may have the identical numbers or the different numbers.

The first dual-axial tracking solar type reflective mirror group 30 and the second dual-axial tracking solar type reflective mirror group 40 have the numbers adjustable as necessary according to an amount of heat collection, a situation of an installation site, or the like.

The surface area of the one reflective mirror 31 and the one reflective mirror 41 (the area on the front surface side exposed to the solar light) is about 10% of the surface area of the one linear Fresnel type reflective mirror 21.

As the reflective mirror 31 and the reflective mirror 41, for example, a reflective mirror with a size of around 2×2 m is applicable. Note that, as long as dual-axis control can be performed with the reflective mirror, the size is not limited to the above-described size.

Figure 3:
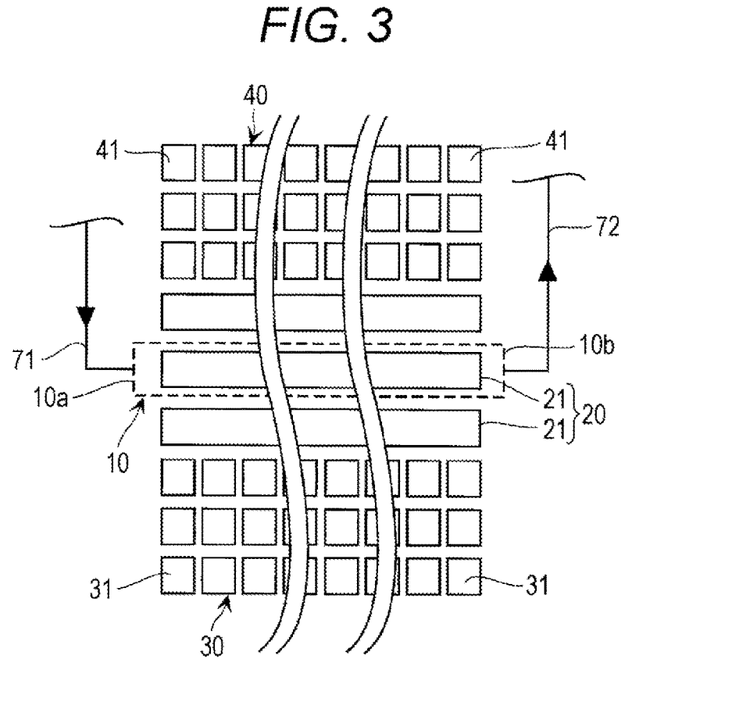
FIG. 3 is a plan view illustrating an arranged state of a reflective mirror group with heat collection means (Note that, the illustration is simplified.) in the solar heat collector illustrated in FIG. 2 (Note that, the number of mirrors is not identical to that of FIG. 2).

FIGS. 2 and 3 illustrate the square reflective mirrors as the reflective mirrors 31 and the reflective mirrors 41. Note that, the reflective mirrors may have another shape.

The heat collection means 10 includes a combination of the first heat collection pipes 11, which have the small amount of heat collection per unit area, and the second heat collection pipes 12, which have the amount of heat collection per unit area larger than that of the first heat collection pipes 11.

The plurality of respective first heat collection pipes 11 and second heat collection pipes 12 are coupled in alternation in the longitudinal direction.

The first heat collection pipes 11 are heat collection pipes that receive the reflected light from only the single-axial tracking solar type reflective mirror group 20 to collect the heat.

The second heat collection pipes 12 are heat collection pips that receive the reflected light from the single-axial tracking solar type reflective mirror group 20 and the dual-axial tracking solar type reflective mirror groups 30 and 40 to collect the heat.

Both the first heat collection pipe 11 and the second heat collection pipe 12 are double-structure pipes that include an inner metal pipe through which a heating medium flows, a glass pipe outside the metal pipe, and a vacuum space between the metal pipe and the glass pipe. The heat collection pipe having the above-described double-pipe structure itself is publicly known as the heat collection pipe (the above-described JP-A-2014-6018, JP-A-2015-144445 and E-NEXI (ISSUED IN OCTOBER, 2010)).

In FIG. 2, for easy understanding of a difference between the first heat collection pipe 11 and the second heat collection pipe 12, the first heat collection pipe 11 and the second heat collection pipe 12 have outer diameters of different sizes. However, the heat collection pipes with identical dimensions are also applicable.

The first heat collection pipes 11 with the small amount of heat collection per unit area and the second heat collection pipes 12 with the amount of heat collection per unit area larger than that of the first heat collection pipes 11 are adjusted such that the second heat collection pipes 12 have the larger amount of heat collection (amount of heat energy) when identical areas are irradiated with solar light.

It is only necessary that an amount of heat collection per unit area of the first heat collection pipe 11 (E1) and an amount of heat collection per unit area of the second heat collection pipe 12 (E2) meet the relationship of E2>E1. Note that, the relationship of E2/E1≥1.5 is preferably met.

As a method for providing the magnitude relationship of the amount of heat collections (the amount of heat energies) to the first heat collection pipe 11 and the second heat collection pipe 12, a method for forming different wavelength-selective films on the respective surfaces of the metal pipes is applicable.

Here, the "wavelength-selective film" means a film having an effect identical to a "light-selective absorbing film 12" in JP-A-2014-6018 and a "wavelength-selective reflection film" in JP-A-2010-72549.

As a method for increasing the amount of heat collection of the second heat collection pipe 12 larger than the amount of heat collection of the first heat collection pipe 11, a method for setting a relationship between a transmission amount (X1) of a thermal component (a long wavelength side) of the wavelength-selective film formed on the surface of the metal pipe of the first heat collection pipe 11 and a transmission amount (X2) of a thermal component (a long wavelength side) of the wavelength-selective film formed on the surface of the metal pipe of the second heat collection pipe 12 to X2>X1 is applicable.

For example, setting a relationship between an area (Y1) of the wavelength-selective film that can transmit the thermal component (the long wavelength side) formed on the surface of the metal pipe of the first heat collection pipe 11 and an area (Y2) of the wavelength-selective film that can transmit the thermal component (the long wavelength side) formed on the surface of the metal pipe of the second heat collection pipe 12 to Y2>Y1 ensures meeting the relationship of X2>X1.

As the first heat collection pipe 11 and the second heat collection pipe 12, SCHOTT PTR 70Advance, SCHOTT PTR 70 Premium, SCHOTT PTR 70, and the like, which are double-structure pipes for solar light heat collection sold by SCHOTT in Germany, are also applicable. Among these double-structure pipes, SCHOTT PTR 70Advance has the maximum amount of heat collection. Therefore, the SCHOTT PTR 70Advance is applicable as the second heat collection pipe.

The first heat collection pipes 11 and the second heat collection pipes 12 are coupled with coupling means (not illustrated).

The coupling means may be any means as long as the coupling means can couple the metal pipe and the glass pipe of the first heat collection pipe 11 to the metal pipe and the glass pipe of the second heat collection pipe 12. Using a method for using a metallic adapter, a method for using a coupling structure and a coupling method illustrated in FIGS. 3 to 6 in JP-A-2014-6018, a coupling structure and a coupling method illustrated in FIGS. 1 and 2 in JP-A-2015-14444, and the like, the first heat collection pipes 11 and the second heat collection pipes 12 can be coupled.

The first heat collection pipes 11 and the second heat collection pipes 12, which constitute the heat collection means 10, include a continuous heating medium flow passage (a continuous metal pipe) from a first end 10a to a second end 10b.

The first end 10a side, which is positioned upstream on the heat collection means 10, is coupled to an inlet-side transport pipe 71 for the heating medium. The second end 10b side, which is positioned downstream, is coupled to an outlet-side transport pipe 72 for the heating medium.

The inlet-side transport pipe 71 and the outlet-side transport pipe 72 are formed of a metal pipe. As necessary, to keep the temperature, a heat insulating material and the like can be wound around the outsides of the inlet-side transport pipe 71 and the outlet-side transport pipe 72.

A part of the inlet-side transport pipe 71 and the outlet-side transport pipe 72 are indicated by the solid lines. Note that, the parts with the identical reference numerals belong to the identical heat collection pipe.

The following describes a method for operating a solar heat collector 1 of the present invention with the power generation system illustrated in FIG. 2, which includes the solar heat collector 1B. As the heating medium passing through the first heat collection pipes 11 and the second heat collection pipes 12, publicly known liquid (such as molten salt, hot oil, and water) and gas (such as air, nitrogen, and carbon dioxide) are applicable. The following describes the embodiments using the water.

The water is delivered from the transport pipe 71 to the first water collection pipe 11 of the first end 10a, which is on the upstream of the heat collection means 10. The water is fed from a water source (not illustrated) at the beginning of the operation.

In the single-axis tracking according to the position of the sun, the single-axial solar type reflective mirror group 20 reflects and sends the received solar heat to the first heat collection pipes 11 and the second heat collection pipes 12.

Figure 4:
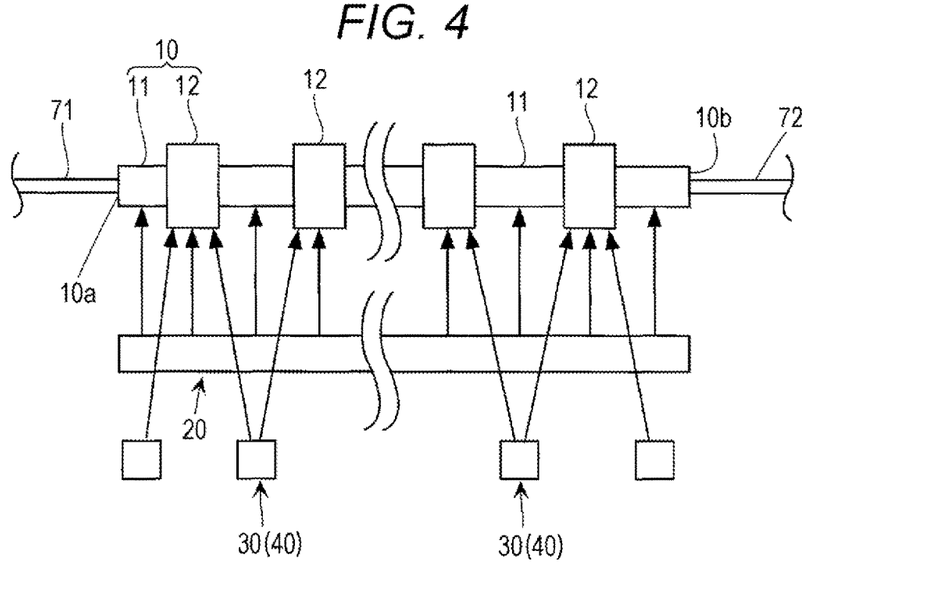
FIG. 4 is a schematic diagram to describe a relationship between the reflective mirror group and the heat collection means in the heat collection means illustrated in FIG. 2.

As illustrated in FIG. 4, in the dual-axis tracking according to the position of the sun, the first dual-axial tracking solar type reflective mirror group 30 and the second dual-axial tracking solar type reflective mirror group 40 reflect and send the received solar heat to the second heat collection pipes 12.

Thus, the second heat collection pipes 12 receive the solar heat from the single-axial tracking solar type reflective mirror group 20, the first dual-axial tracking solar type reflective mirror group 30, and the second dual-axial tracking solar type reflective mirror group 40.

Compared with the single-axial tracking reflective mirrors 21 performing line concentration, the dual-axial tracking reflective mirrors 31 and 41 performing point concentration can further precisely adjust the positional relationship between the sun and the reflective mirrors. Therefore, the heat collection efficiency (a heat collection power per unit area of the reflective mirror) and a reaching temperature are increased.

Further, the second heat collection pipe 12 has the amount of heat collection per unit area larger than that of the first heat collection pipe 11.

Consequently, compared with the first heat collection pipes 11, the second heat collection pipes 12 receive the larger heat energy. In view of this, in the process where the water as the heating medium flows from the upstream (the first end 10a) to the downstream (the second end 10b), the water is heated and turns into the high-temperature water vapor (the energy).

As illustrated in FIG. 2, the combination of the first heat collection pipes 11 and the second heat collection pipes 12 as the heat collection means ensures reducing the used parts of the second heat collection pipes 12, which are more expensive than the first heat collection pipes 11. Additionally, as the result, compared with the case of using only the first heat collection pipes 11, this allows obtaining the considerably large amount of energy.

Afterwards, the water vapor is supplied from the water vapor supply pipe 72 to an electric generation apparatus 50 that includes a turbine and an electric generator.

The water vapor supplied to the electric generation apparatus 50 rotates the turbine. A power generated by the rotation of the turbine is transmitted to the electric generator, and thus the electricity is generated.

The water vapor used to rotate the turbine is sent from a vapor return line 73 to a condenser 60. Then, a condensation process is performed on the water vapor, thus returning the water vapor to the water. Afterwards, the water deliver line (the transport pipe) 71 supplies the water to the heat collection means 10.

Insofar as within a time during which the solar light is usable, repeating the above-described circulation operation continues the electric generation using the solar heat.

During nighttime, the electric generation using the heat stored in a heat storage body and the like during daytime is also possible.

Figure 5:
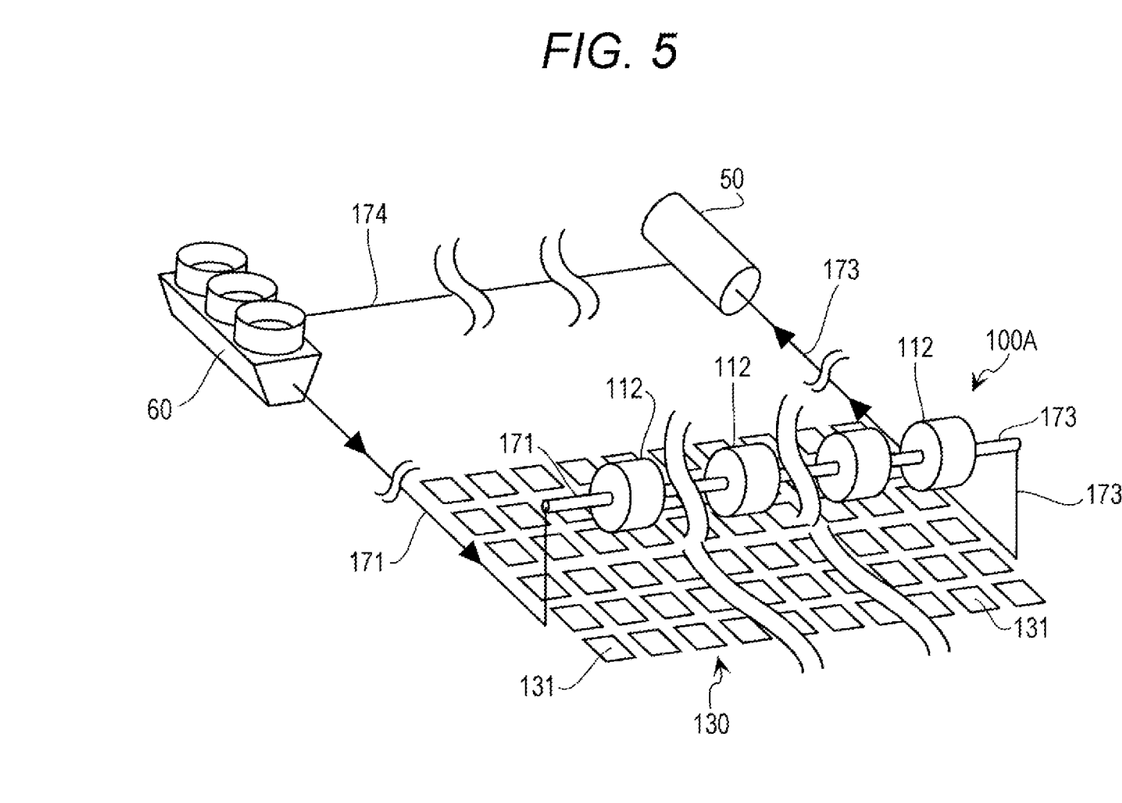
FIG. 5 is a perspective view of a power generation system using a solar heat collector of yet another embodiment.

(3) Solar Heat Collector in FIG. 5 (Third Invention)

The heat collection means in a solar heat collector 100A illustrated in FIG. 5 includes a combination of heat collection pipes 112. The heat collection pipes 112 are mutually coupled with a transport pipe 171 for the heating medium.

A dual-axial tracking solar type reflective mirror group 130 is a reflective mirror identical to the single-axial tracking solar type reflective mirror group 30 illustrated in FIG. 1. A required number of reflective mirrors 131 are in combination.

Reference numerals identical to those of FIG. 1 mean the identical members.

The heat collection pipe 112 is a heat collection pipe identical to the second heat collection pipe 12 illustrated in FIG. 1.

As the heat collection pipe 112, instead of the heat collection pipe identical to the second heat collection pipe 12 illustrated in FIG. 1, the heat collection pipe identical to the first heat collection pipe 11 illustrated in FIG. 1 is also applicable. The use of the heat collection pipes identical to the first heat collection pipes 11 and the second heat collection pipes 12 illustrated in FIG. 1 in combination is also possible. In any cases, the heat collection pipes are selected according to the amount of solar light collected at the reflective mirrors per unit area of the heat-receiving pipe.

For example, when the heat collection pipes 112 ten in total are used, the five heat collection pipes identical to the first heat collection pipes 11 illustrated in FIG. 1 and the five heat collection pipes identical to the second heat collection pipes 12 illustrated in FIG. 1 can be combined in alternation.

In the combination of the heat collection pipes 112, the heat collection pipes 112 with the length of less than 2 m in average are coupled with a transport pipe (an intermediate transport pipe 172) for the heating medium with a length of 3 m or more in average. To reduce heat loss, covering the transport pipe with the heat insulating material and the like also ensures keeping the temperature.

The following describes a method for operating a solar heat collector 100 of the present invention with the power generation system illustrated in FIG. 5, which includes the solar heat collector 100A. As the heating medium passing through the combination of the heat collection pipes 112, publicly known liquid (such as molten salt, hot oil, and water) and gas (such as air, nitrogen, and carbon dioxide) are applicable. The following describes the embodiments using the water.

The water is delivered from the transport pipe 171 to the combination of the heat collection pipes 112, which is on the upstream of the heat collection means 10. The water is fed from a water source (not illustrated) at the beginning of the operation.

In the dual-axial tracking according to the position of the sun, the dual-axial solar type reflective mirror group 130 each reflects and sends the received solar heat to the combination of the heat collection pipes 112.

Compared with the single-axial tracking type reflective mirrors performing the line concentration, the dual-axial tracking type reflective mirrors 131 performing the point concentration can further precisely adjust the positional relationship between the sun and the reflective mirrors. Therefore, the heat collection efficiency (the heat collection power per unit area of the heat-receiving pipe) and the reaching temperature are increased.

As the heat collection pipe 112, the heat collection pipe having the high amount of heat collection per unit area is used.

Thus, in the heat collector 100A illustrated in FIG. 5, the dual-axial tracking solar type reflective mirror group 130 is used in combination only with the plurality of heat collection pipes identical to the second heat collection pipes 12 used in the first invention and the second invention. Accordingly, the entire length of the heat collection pipes can be shortened.

In view of this, an amount of heat dissipation (heat loss) from the heat collection pipes can be reduced without lowering the heat collection effect. Therefore, compared with the other inventions, the considerably large amount of energy can be obtained.

Afterwards, the water vapor is supplied from the water vapor supply pipe 173 to an electric generation apparatus 50 that includes a turbine and an electric generator.

The water vapor supplied to the electric generation apparatus 50 rotates the turbine. A power generated by the rotation of the turbine is transmitted to the electric generator, and thus the electricity is generated.

The water vapor used to rotate the turbine is sent from a vapor return line 173 to a condenser 60. Then, a condensation process is performed on the water vapor, thus returning the water vapor to the water. Afterwards, the water deliver line (the transport pipe) 171 supplies the water to the first heat collection means 111.

Insofar as within a time during which the solar light is usable, repeating the above-described circulation operation continues the electric generation using the solar heat.

During nighttime, the electric generation using the heat stored in a heat storage body and the like during daytime is also possible.

Figure 6:
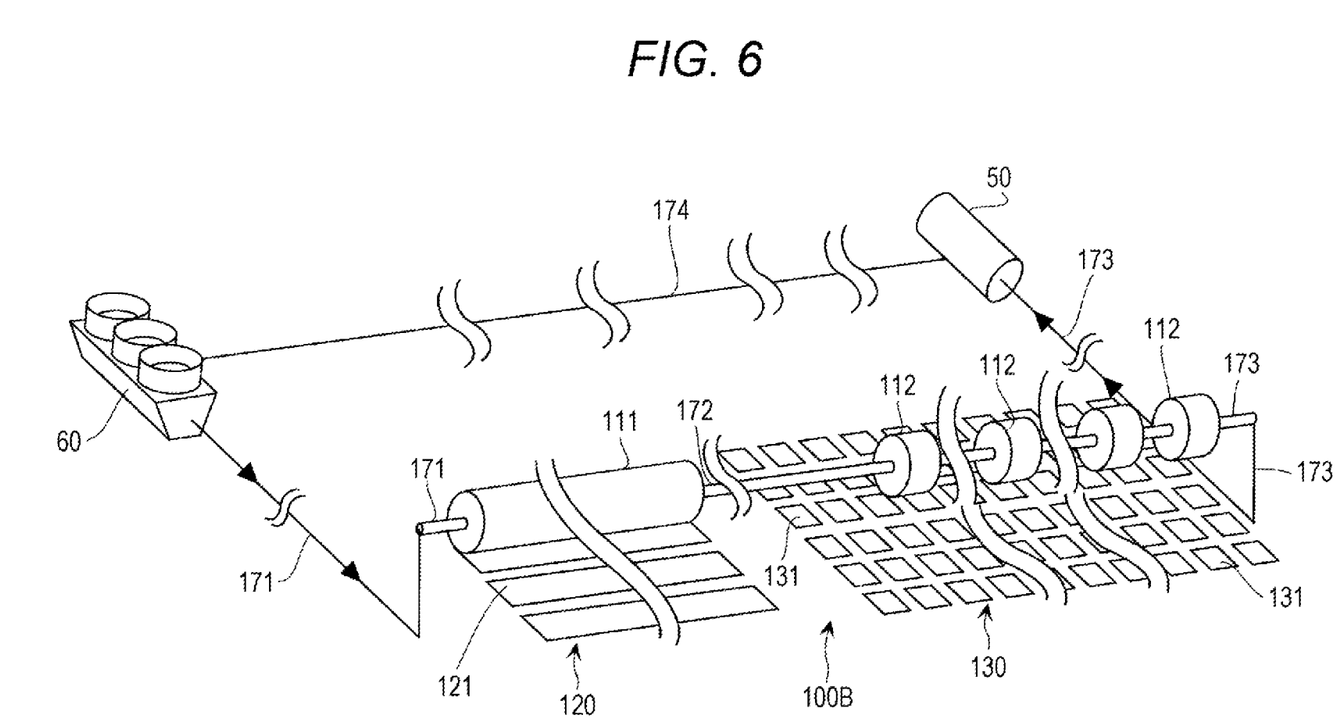
FIG. 6 is perspective view of a power generation system using a solar heat collector of yet another embodiment.

(4) Solar Heat Collector in FIG. 6 (Fourth Invention)

Heat collection means in a solar heat collector 100B illustrated in FIG. 6 includes a combination of a first heat collection pipe 111 and the second heat collection pipes 112. Note that, unlike the solar heat collector 1B illustrated in FIG. 2, the combination of the first heat collection pipe 111 and a single-axial tracking solar type reflective mirror group 120 is disposed on the upstream. Furthermore, a combination of the second heat collection pipes 112 and the dual-axial tracking solar type reflective mirror group 130 are disposed on the downstream.

The single-axial tracking solar type reflective mirror group 120 is reflective mirrors identical to those of the single-axial tracking solar type reflective mirror group 20 illustrated in FIG. 1. A required number of reflective mirrors 121 are in combination.

The dual-axial tracking solar type reflective mirror group 130 is a reflective mirror identical to the single-axial tracking solar type reflective mirror groups 30 and 40 illustrated in FIG. 1. The required number of reflective mirrors 131 is in combination.

Reference numerals identical to those of FIG. 2 mean the identical members.

The first heat collection pipe 111 is a heat collection pipe identical to the first heat collection pipe 11 illustrated in FIG. 2. The second heat collection pipe 112 is a heat collection pipe identical to the second heat collection pipe 12 illustrated in FIG. 2.

With the embodiment of FIG. 2, the first heat collection pipes 11 and the second heat collection pipes 12 are combined and disposed in alternation. However, with the embodiment of FIG. 6, the first heat collection pipe 111 is disposed separately from the second heat collection pipes 112.

The first heat collection pipe 111 may include one heat collection pipe. Alternatively, the first heat collection pipes 111 may include a plurality of coupled heat collection pipes.

As the second heat collection pipes 112, the second heat collection pipes 112 with the length of less than 2 m in average are coupled with the transport pipe (the intermediate transport pipe 172) for the heating medium with a length of 3 m or more in average.

The following describes a method for operating a solar heat collector 100 of the present invention with the power generation system illustrated in FIG. 6, which includes the solar heat collector 100B. As the heating medium passing through the first heat collection pipe 111 and the second heat collection pipes 112, the publicly known liquid (such as the molten salt, the hot oil, and the water) and gas (such as the air, the nitrogen, and the carbon dioxide) are applicable. The following describes the embodiments using the water.

The water is delivered from the inlet-side transport pipe 171 to the first water collection pipe 111, which is on the upstream of the heating medium flow. The water is fed from the water source (not illustrated) at the beginning of the operation.

In the single-axis tracking according to the position of the sun, the single-axial tracking solar type reflective mirror group 120 reflects and sends the received solar heat to the first heat collection pipe 111.

The water in the first heat collection pipe 111 is heated and turns into the water vapor (the energy). The intermediate transport pipe 172 sends the water vapor to the second heat collection pipes 112.

In the dual-axial tracking according to the position of the sun, the dual-axial solar type reflective mirror group 130 reflects and sends the received solar heat to the heat collection pipes 112.

Compared with the single-axial tracking reflective mirrors 121 performing the line concentration, the dual-axial tracking reflective mirrors 131 performing the point concentration can further precisely adjust the positional relationship between the sun and the reflective mirrors. Therefore, the heat collection efficiency (the heat collection power per unit area of the heat-receiving pipe) and the reaching temperature are increased. Further, the second heat collection pipe 112 has the amount of heat collection per unit area larger than that of the first heat collection pipe 111.

In view of this, the water vapor sent from the first heat collection pipe 111 is heated at the second heat collection pipes 112 and turns into the water vapor at a higher temperature.

As illustrated in FIG. 6, the combination of the first heat collection pipe 111 and the second heat collection pipes 112 as the heat collection means ensures decreasing the used parts of the second heat collection pipes 112, which are more expensive than the first heat collection pipe 111. Additionally, compared with the case of using only the first heat collection pipe 111, this allows shorting the length of the heat-receiving pipe at the second heat collection pipe 112 and additionally allows decreasing the heat loss. Consequently, the considerably large amount of energy can be obtained.

Afterwards, the water vapor is supplied from the water vapor supply pipe 173 to the electric generation apparatus 50 that includes the turbine and the electric generator.

The water vapor supplied to the electric generation apparatus 50 rotates the turbine. The power generated by the rotation of the turbine is transmitted to the electric generator, and thus the electricity is generated.

The water vapor used to rotate the turbine is sent from the vapor return line 173 to the condenser 60. Then, the condensation process is performed on the water vapor, thus returning the water vapor to the water. Afterwards, the water deliver line (the transport pipe) 171 supplies the water to the first heat collection means 111.

Insofar as within the time during which the solar light is usable, repeating the above-described circulation operation continues the electric generation using the solar heat.

During the nighttime, the electric generation using the heat stored in the heat storage body and the like during the daytime is also possible.

A solar heat collector of the present invention is applicable to a solar power generation. Besides, the solar heat collector of the present invention is also applicable as a supply system of warm water or a heating system using vapor, or warm water or hot air.

The solar heat collector of the present invention can increase a proportion of local procurement of materials and machinery. This is important to progress measures for spreading the solar energy use.

The above description of specific embodiments of the present invention is disclosed as illustrative. This description does not intend to be exhaustive or limit the present invention to the described embodiments as they are. Many modifications and variations will be apparent to one of ordinary skill in the art in light of the above teachings.

The invention claimed is:

1. A solar heat collector comprising:
   a reflective mirror group including a single-axial tracking solar type reflective mirror group and a dual-axial tracking solar type reflective mirror group;
   a heat collection collector configured to collect light from the reflective mirror group to obtain heat, and
   a heating medium is caused to move from a first end of the heat collector on an upstream to a second end on an opposite side on a downstream,
   wherein:
   the heat collector comprising a continuous heating medium flow passage including a combination of a first heat collection pipe and a second heat collection pipe, the first heat collection pipe having a small amount of heat collection per unit area, the second heat collection pipe having an amount of heat collection per unit area larger than the first heat collection pipe,
   the first heat collection pipe and the second heat collection pipe have a double-pipe structure including an inner metal pipe, a glass pipe, and a vacuum space, the heating medium flowing through the metal pipe, the glass pipe being disposed outside the metal pipe, the vacuum space being disposed between the metal pipe and the glass pipe,
   the first heat collection pipe receives reflected light only from the single-axial tracking solar type reflective mirror group to collect heat, and
   the second heat collection pipe receives reflected light from both the single-axial tracking solar type reflective mirror group and the dual-axial tracking solar type reflective mirror group to collect heat.

2. The heat collector according to claim 1, wherein:
   the heat collector comprises the combination of the first heat collection pipe and the second heat collection pipe includes the first heat collection pipe and the second heat collection pipe coupled in alternation in a longitudinal direction.

3. The heat collector according to claim 1, wherein:
the single-axial tracking solar type reflective mirror group includes a combination of reflective mirrors selected from Fresnel reflective mirrors and trough reflective mirrors, and
the dual-axial tracking solar type reflective mirror group includes a combination of dual-axial tracking solar type reflective mirrors, the dual-axial tracking solar type reflective mirror having a surface area 5 to 20% of a surface area of the one single-axial tracking solar type reflective mirror.

4. A solar heat collector comprising:
a reflective mirror group including a single-axial tracking solar type reflective mirror group and a dual-axial tracking solar type reflective mirror group;
a heat collector configured to collect light from the reflective mirror group to obtain heat; and
a heating medium is caused to move from a first end of the heat collector on an upstream to a second end on an opposite side on a downstream,
wherein the heat collector comprises a continuous heating medium flow passage including a combination of a first heat collection pipe and a second heat collection pipe, wherein:
 the first heat collection pipe having a small amount of heat collection per unit area,
 the second heat collection pipe having an amount of heat collection per unit area larger than the first heat collection pipe,
 the first heat collection pipe and the second heat collection pipe have a double-pipe structure including an inner metal pipe, a glass pipe, and a vacuum space, the heating medium flowing through the metal pipe, the glass pipe being disposed outside the metal pipe, the vacuum space being disposed between the metal pipe and the glass pipe,
 the first heat collection pipe is disposed on the upstream, the second heat collection pipe being disposed on the downstream with respect to the first heat collection pipe, the first heat collection pipe being coupled to the second heat collection pipe by at least a transport pipe for the heating medium,
 the first heat collection pipe only receives reflected light from the single-axial tracking solar type reflective mirror group to collect heat, and
 the second heat collection pipe receives reflected light from both the single-axial tracking solar type reflective mirror group and the dual-axial tracking solar type reflective mirror group to collect heat.

5. The solar heat collector according to claim 4, wherein:
the first heat collection pipe is a plurality of the first heat collection pipes coupled to one another,
the second heat collection pipe is a plurality of the second heat collection pipes coupled with the transport pipe for the heating medium, and
the first heat collection pipes disposed on the upstream and the second heat collection pipes disposed on the downstream are coupled with the transport pipe for the heating medium.

6. The solar heat collector according to claim 4, wherein:
the first heat collection pipe is a plurality of the first heat collection pipes coupled to one another,
the second heat collection pipe is a plurality of the second heat collection pipes with a length of less than 2 m, the second heat collection pipes being coupled to one another with the transport pipe for the heating medium with a length of 3 m or more, and
the first heat collection pipes disposed on the upstream and the second heat collection pipes disposed on the downstream are coupled with the transport pipe for the heating medium.

7. The solar heat collector according to claim 4, wherein:
the single-axial tracking solar type reflective mirror group includes a combination of reflective mirrors selected from Fresnel reflective mirrors and trough reflective mirrors, and
the dual-axial tracking solar type reflective mirror group includes a combination of dual-axial tracking solar type reflective mirrors, the dual-axial tracking solar type reflective mirror having a surface area 5 to 20% of a surface area of the one single-axial tracking solar type reflective mirror.

* * * * *